(12) United States Patent
Liu et al.

(10) Patent No.: US 6,980,783 B2
(45) Date of Patent: Dec. 27, 2005

(54) APPARATUS AND METHOD OF CONTROLLING LOW FREQUENCY LOAD CURRENTS DRAWN FROM A DC SOURCE IN A TELECOMMUNICATIONS SYSTEM

(75) Inventors: Yan-Fei Liu, Kingston (CA); Raymond Orr, Kanata (CA); Kai Xu, Nepean (CA)

(73) Assignee: Ciena Corporation, Linthicum, MD (US)

( * ) Notice: Subject to any disclaimer, the term of this patent is extended or adjusted under 35 U.S.C. 154(b) by 457 days.

(21) Appl. No.: 10/265,168

(22) Filed: Oct. 3, 2002

(65) Prior Publication Data

US 2004/0204173 A1 Oct. 14, 2004

(30) Foreign Application Priority Data

May 31, 2002 (CA) ................................ 2388434

(51) Int. Cl.[7] ................................ H04B 1/10
(52) U.S. Cl. .................. 455/296; 455/307; 455/127.1; 363/98; 363/132; 323/281; 323/275
(58) Field of Search ................................ 455/296, 307, 455/127.1; 363/15, 17, 34, 37, 132, 98; 323/281, 323/275

(56) References Cited

U.S. PATENT DOCUMENTS

| | | | |
|---|---|---|---|
| 3,571,697 A | | 3/1971 | Phillips |
| 4,940,929 A | | 7/1990 | Williams |
| 5,602,465 A | | 2/1997 | Clemente |
| 5,625,539 A | * | 4/1997 | Nakata et al. ................. 363/17 |
| 5,892,674 A | * | 4/1999 | Shimada et al. ............ 363/127 |
| 6,282,111 B1 | * | 8/2001 | Illingworth ................... 363/98 |
| 6,377,478 B1 | * | 4/2002 | Morishita ..................... 363/34 |
| 6,661,210 B2 | * | 12/2003 | Kimball et al. ............. 323/268 |

* cited by examiner

*Primary Examiner*—Danh Cong Le
(74) *Attorney, Agent, or Firm*—Merek, Blackmon & Voorhees, LLC

(57) ABSTRACT

A circuit controls the low frequency load currents drawn by components of telecommunications systems. The circuit includes a power converter, a first sense circuit, a second sense circuit, a comparator, and a power converter control circuit. The power converter control circuit controls the power converter's duty cycle in accordance with the input signal compared to a reference. In this manner, the low frequency load currents may be easily and economically controlled.

12 Claims, 4 Drawing Sheets

APPARATUS AND METHOD OF CONTROLLING LOW FREQUENCY LOAD CURRENTS DRAWN FROM A DC SOURCE IN A TELECOMMUNICATIONS SYSTEM

BACKGROUND OF THE INVENTION

The present invention relations to a circuit for controlling low frequency noise currents drawn from DC power sources by loads requiring substantial AC energy at low frequencies.

In telecommunication systems, fans are generally used to reduce equipment's temperature rise. The fan's speed is controlled by a motor, which is usually controlled by a voltage applied across its terminal. A motor speed controller is used to control the motor speed and maintain a desired voltage level. The motor speed controller is often required because the telecommunication system's battery voltage often varies over a wide range. For example, the voltage range of a 48V system can vary from 36V to 75V, with a transient up to 100V. Thus, the motor speed controller provides a constant voltage to the motor terminals to maintain the constant motor speed when the battery voltage changes over a wide range.

It is well known that a direct current (DC) motor will draw a current that has a significant low frequency alternating current (AC) component. For example, referring to FIG. 1, a waveform is resulting from a DC motor with 24V/1.5 A (36 W) output is illustrated. With 24V DC voltage applied to the motor, the DC value of the motor current is about 1.5 A. However, the AC component is 2.5 A peak to peak. The frequency of the AC current is about 275 Hz. Additionally, there are significant harmonic components in the waveform.

The motor speed controller is a DC to DC switching power supply with an inherently fast response for maintaining the output voltage at a constant level. The low frequency AC component of the motor current is reflected in the input of the motor speed controller. Therefore, the input current of the motor speed controller has a similar shape, which includes a significant low frequency AC component.

Existing telecommunication equipment standards require that the input current of the motor controller must meet both wide band and voice band noise limits, which are much lower than the AC current, described above. In the example illustrated in FIG. 1, the noise of the AC current is approximately 43 dbrnc and the standard requires that the noise should be less than 9 dbrnc. For a 3 db noise margin, a 37 dbrnc (43−9+3) attenuation of the AC current is required.

Referring to FIG. 2, a standard method for attenuating the AC current is illustrated. An inductor-capacitor (LC) low frequency filter is added between the telecommunications equipment power source and the motor speed controller. A current $I_{motor}$ between the motor speed controller and the fan comprises a large low frequency AC current component. There is also a significant amount of low frequency AC current in an input current $I_Q$ of the motor speed controller. The value of capacitor C1 and inductor L1 is very large, thus the impedance of capacitor C1, XC1, is very small and the impedance of L1, XL1, is very large. Therefore, a low frequency AC current $I_{ac}$ flows through the capacitor C1 and a DC current $I_{dc}$ flows through the inductor L1. As a result, the input battery current, $I_{bat}$ is DC.

However, since the frequency of the AC current is very low, approximately 275 Hz in the above example, the values of L1 and C1 should be very large. In the above example, in order to meet the requirements set by the standard, the values for L1 and C1 are selected as C1=2200 uF and L1=1000 uH. The size of such an inductor is fairly large, increasing its cost and space requirement. Furthermore, although the normal operating voltage for the system is 48V, the voltage rating for the capacitor C1 should be higher than 48V because the input voltage may range between 36V and 75V or even wider. Such a capacitor further adds to the cost and space requirement for the system.

Referring to FIG. 3, an alternate solution to the problem is illustrated. In this solution, an active filter is placed between the telecommunications equipment power source and the motor speed controller. An active filter controller controls the voltage across MOSFET Q in such a way that the terminal characteristics of the MOSFET, that is the voltage across drain to source and the current through the drain to source, behaves like a large inductor.

However, the problem with the active filter is a large power loss in the MOSFET Q. The voltage across the MOSFET Q (VDS) should be higher than the worst case ripple voltage across capacitor C1 in order for the active filter to operate properly. The worst case ripple voltage happens at minimum input voltage when the input current is at maximum value. Another limitation is the gain of the MOSFET Q is very small when it operates at low drain to source voltage region. In a practical situation, the voltage across MOSFET Q should be larger than 1V, and is typically between 2–3 V. This causes significant power loss in the MOSFET Q.

Further, it should be noted that in other applications, it is required to attenuate low frequency noise generated by electronic loads other than a motor of a fan. Such loads present the same difficulties as that described for fan.

It is an object of the present invention to obviate or mitigate at least some of the above mentioned disadvantages.

BRIEF SUMMARY OF THE INVENTION

In accordance with an aspect of the present invention, there is provided a circuit for reducing low frequency noise currents drawn from a DC power supply by a load circuit requiring AC power at low frequencies. The circuit comprises the following components. A power converter converts an input voltage to a desired output voltage. A first sense circuit senses an input current signal to said power converter. A second sense circuit senses a voltage signal at the load. A comparator is coupled with the second sense circuit for determining, and providing as its output, a signal representative of a difference between the signal at the load and a predefined reference voltage. The comparator has a limited bandwidth as compared to the AC load requirement. A power converter control circuit has its inputs coupled with the first sense circuit and the comparator output, and its output is coupled with the power converter for controlling a duty cycle of the switch. The duty cycle is controlled in accordance with a relationship between the input signal and the comparator output.

The present invention relates to a load voltage controller that inhibits low frequency AC current generated by a load from transmitting into the input voltage rail of the load voltage controller. It is an advantage of the present invention that the cost of the implementation is lower and the size is smaller than that used by existing voltage controllers.

BRIEF DESCRIPTION OF THE DRAWINGS

An example of the present invention will now be described by way of example only with reference to the following drawings, in which:

FIG. 4b is a more detailed schematic diagram one implementation of the voltage control circuit illustrated in FIG. 4a.

DETAILED DESCRIPTION OF THE INVENTION

Figure 1:
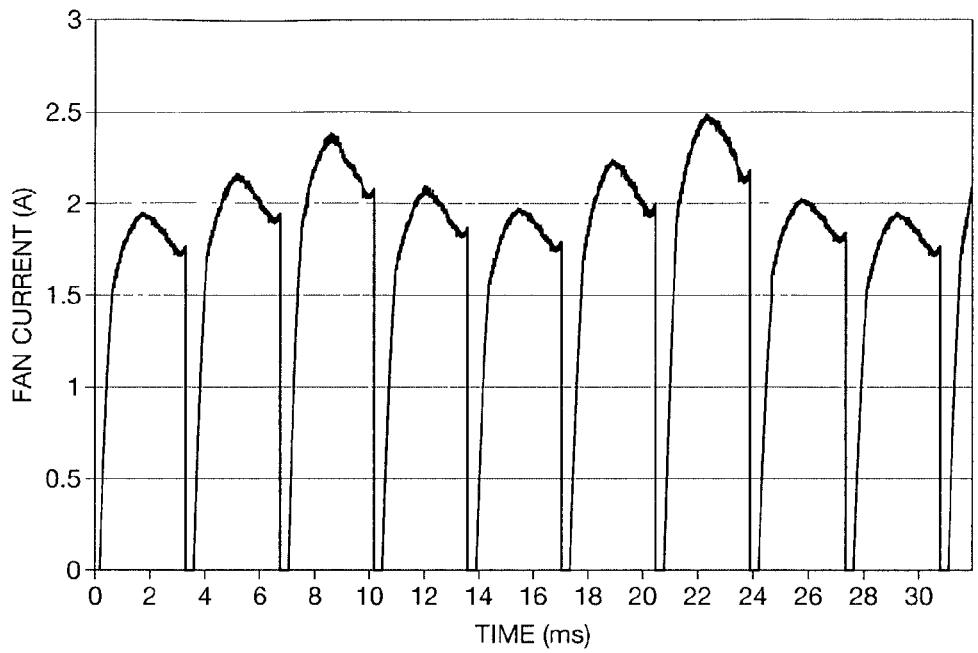
FIG. 1 is a graph illustrating a typical motor current waveform.
Figure 2:
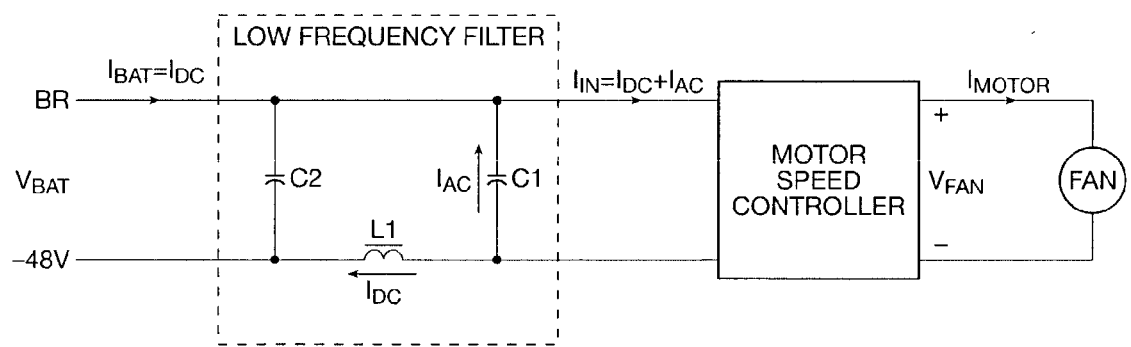
FIG. 2 is a schematic diagram of a low frequency filter for attenuating a motor's AC current (prior art)
Figure 3:
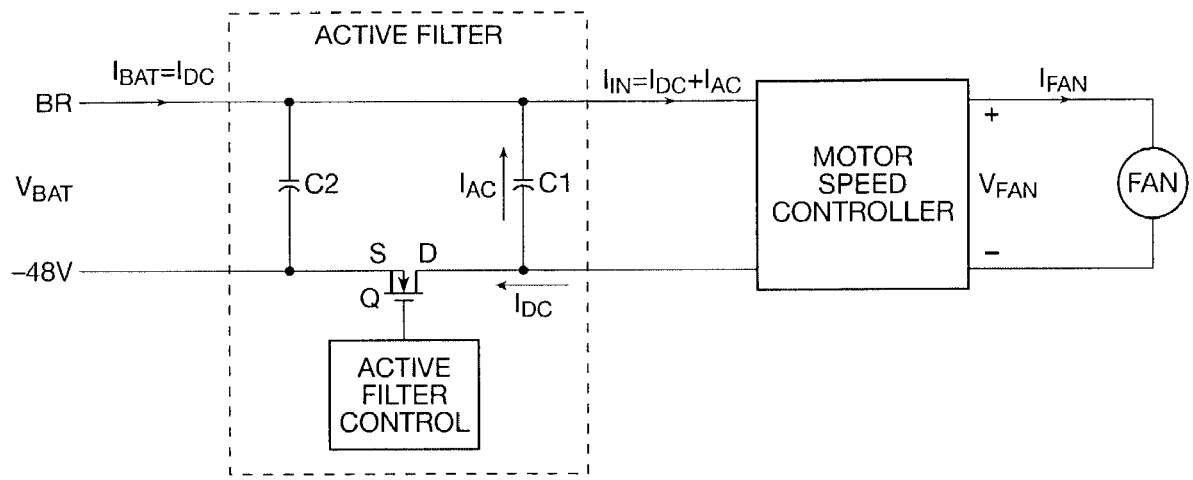
FIG. 3 is a schematic diagram of an active filter for attenuating a motor's AC current (prior art)

For convenience, like numerals in the description refer to like structures in the drawings. The invention provides a method for controlling low frequency noise currents drawn from a DC supply by load circuits that require substantial AC energy at low frequencies. In a telecommunication embodiment, frequencies in the voice band require very large inductors and capacitors to form a conventional filter with adequate attenuation. This type of requirement arises when loads drawing pulses of current at low frequencies are connected to the battery. A cooling fan is one example of this type of load.

Figure 4A:
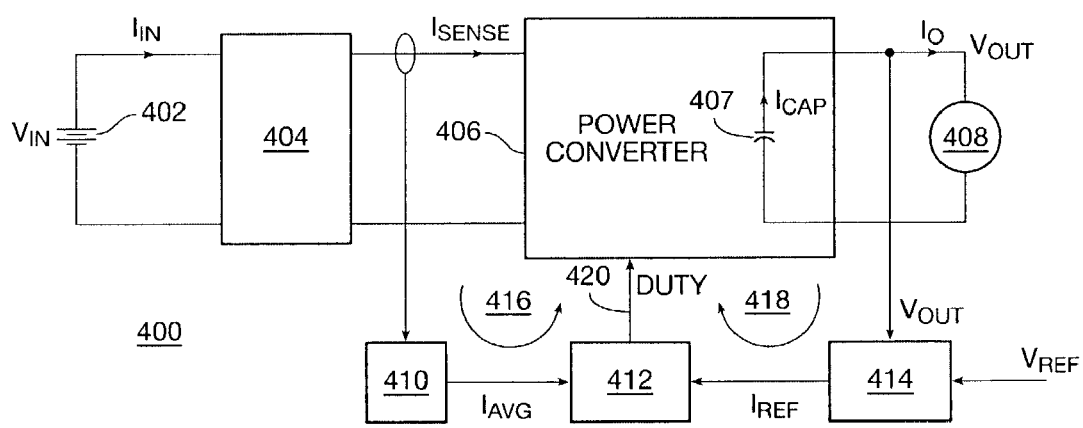
FIG. 4a is a schematic diagram of a voltage control circuit in accordance with an embodiment of the invention.
Figure 4B:
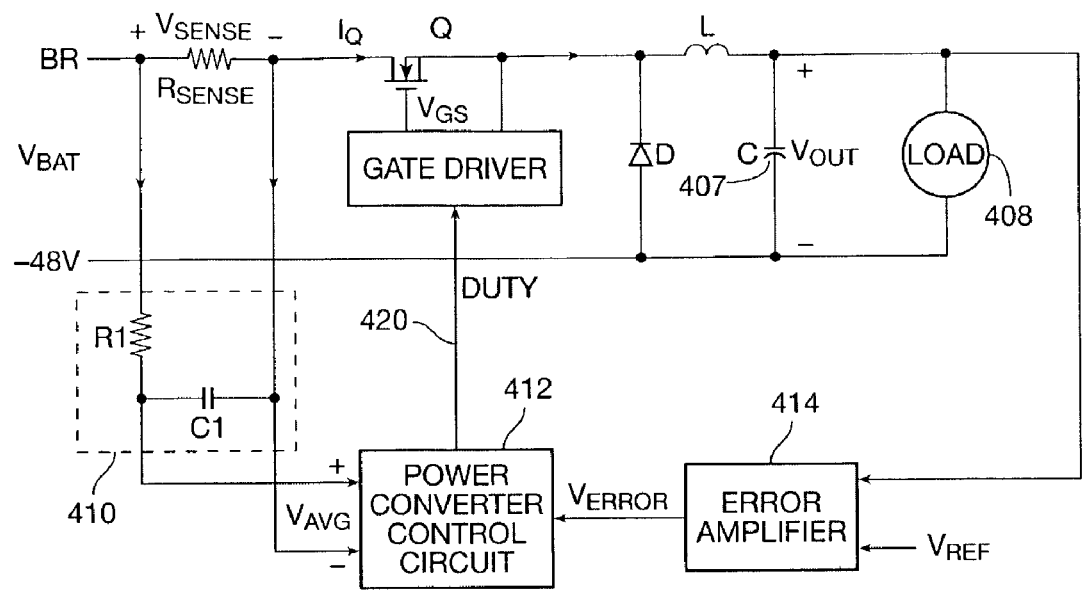

Referring to FIGS. 4a and 4b, an embodiment of the invention illustrated generally by numeral 400. A battery terminal 402 of the telecommunication equipment (not shown) is coupled with a power converter 406 via a high frequency filter 404. A sense resistor $R_{sense}$ is coupled between the high frequency filter 404 and the power converter 406. The power converter 406 is coupled to a low frequency generating load, such as a fan motor, 408. A capacitor 407 is coupled in parallel between the power converter 406 and the load 408. Generally, the capacitor 407 is a component of the power converter 406, but is shown in the drawing for illustrative purposes.

A low pass filter 410 has, as its input, a voltage $V_{sense}$ sensed across the sense resistor $R_{sense}$. The low pass filter 410 has its output coupled to a power converter control circuit 412. A voltage error amplifier 414 has, as its inputs, a voltage $V_{out}$ sensed at the load 408 and a reference voltage $V_{ref}$. The reference voltage $V_{ref}$ is the desired voltage across the load. The voltage error amplifier 414 has its output coupled to the power converter control circuit 412.

In the present embodiment, the power converter 406 is a buck regulator. However, in practice any one of many switching power topologies may be chosen to provide the power conversion. These topologies include buck-derived topologies such as the forward, the push-pull, the half-bridge or the full-bridge. Furthermore, flyback and boost topologies are also suitable, as will be appreciated by a person skilled in the art.

The voltage control circuit 400 uses two control loops 416 and 418 for controlling the average value of the input current $I_Q$ to the power converter. The average value of the current drawn from the battery terminal 402 will be same as the average value of $I_Q$. The first loop 416 comprises the sense resistor $R_{sense}$, the low pass filter 410, the power converter control circuit 412, and the power converter 406. The second loop 418 comprises load 408, the voltage error amplifier 414, the power converter control circuit 412, and the power converter 406.

The operation of the voltage control circuit 400 is described as follows. The power converter 406 includes a switch that switches on and off at a high frequency to provide a desired average voltage at its output. The switching is controlled by a control signal 420 from the power converter control circuit 412. The greater the duty cycle of the control signal 420 the longer the switch remains on, resulting in a greater average voltage at the output of the power converter 406. Conversely, the lesser the duty cycle of the control signal the shorter the switch remains on, resulting in a lower average voltage at the output of the power converter 406. The average voltage at the output of the power converter 406 is then provided to the load 408.

As a result of the power converter switching, however, the input current $I_{sense}$ to the power converter appears as an AC current. This AC component frequency, unlike that induced by the load, is a high frequency component, and is the same as the switching frequency. The high frequency component of the current is filtered by the high frequency filter 404 to avoid adversely affecting the voltage at the battery terminal. Implementing a high frequency filter is known in the art and does not have the problems associated with implementing a low frequency as described in the prior art. That is, an effective high frequency filter is relatively cheap to implement and requires little space.

Figure 5A:
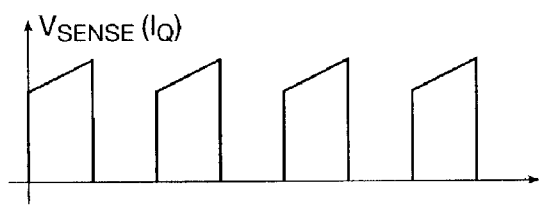
FIG. 5a is a graph illustrating the input voltage $V_{sense}$.
Figure 5B:
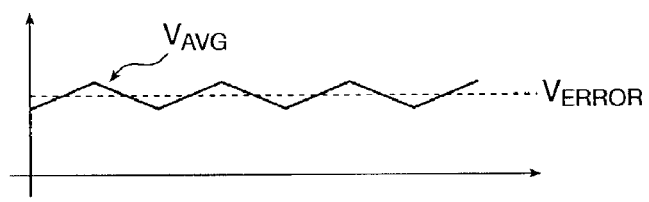
FIG. 5b is a graph illustrating the average input voltage $V_{avg}$.
Figure 5C:
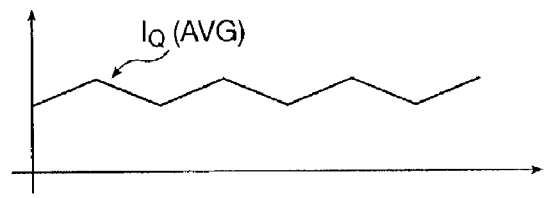
FIG. 5c is a graph illustrating the input current $I_{sense}$.

The first control loop 416 is described as follows. Referring to FIG. 5a the sense voltage $V_{sense}$ sensed across the resistor $R_{sense}$ as the power converter switches on and off is illustrated. Since voltage has a linear relationship to current, the graph also represents a scaled version of the input current $I_{sense}$, which is illustrated in FIG. 5c. Referring to FIG. 5b, the average value of the sense voltage $V_{sense}$, is illustrated. The average voltage is obtained by passing the sense voltage $V_{sense}$ through the low pass filter 410, and is one input to the power converter control circuit 412.

Figure 6A:
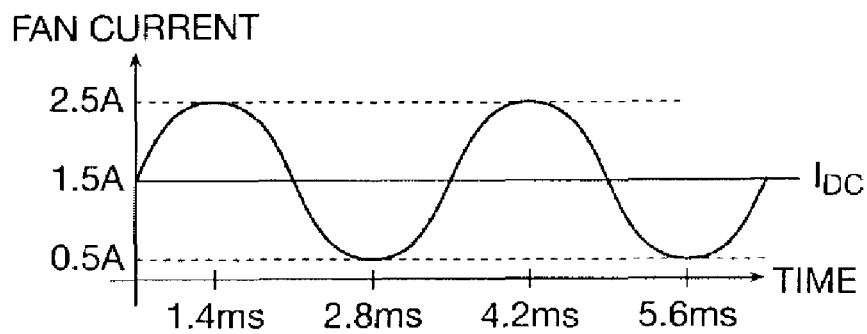
FIG. 6a is a graph illustrating the fan current.
Figure 6B:
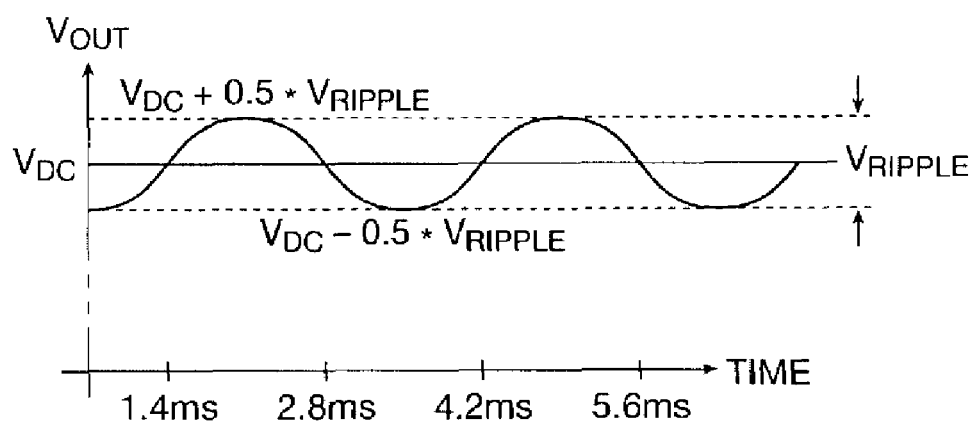
FIG. 6b is a graph illustrating the output voltage $V_{out}$.
Figure 6C:
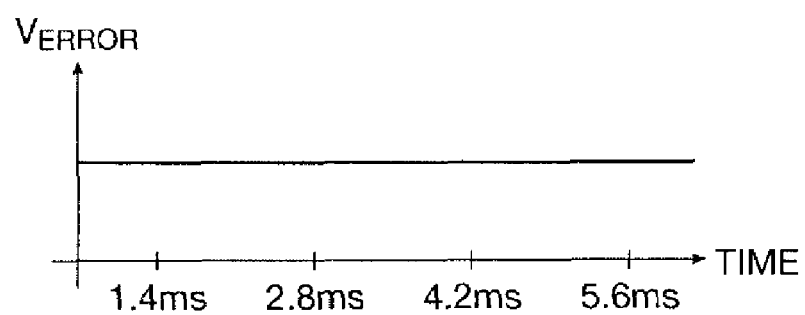
FIG. 6c is a graph illustrating the error voltage $V_{error}$.

The second control loop 418 is described as follows. The voltage $V_o$ across the load is sensed and input to the voltage error amplifier 414. The reference voltage $V_{ref}$ is also input to the voltage error amplifier 414. The voltage error amplifier 414 determines and amplifies the difference between its two input signals and outputs an error voltage $V_{error}$. Error voltage $V_{error}$ is input to the power converter control circuit 412. It should be noted that the bandwidth of the second control loop 418 is designed to be much slower than the frequency of the AC component of the load. This is achieved by selecting the proper resistor and/or capacitor values for the voltage error amplifier 414. The bandwidth desired, as well as the resistor/capacitor values to achieving such a limitation will be apparent to a person skilled in the art in accordance with the implementation. Typically, a design criterion is to limit the bandwidth of the voltage loop to at least 10 times less than the frequency of AC component of the load. In the present embodiment, the frequency of the motor's AC current is approximated 350 Hz. Thus, the bandwidth of the voltage loop is designed to be 20 Hz or less. As a result, the low frequency component of the voltage $V_o$, that is the voltage related to the AC load current, across the load is filtered and the error voltage $V_{error}$ has a DC value without a low frequency component. The AC current from the load is then forced to flow through the capacitor 407. Referring to FIG. 6a–c, waveforms of the load current $I_o$, voltage $V_o$, and error voltage $V_{error}$ are illustrated. Referring to FIG. 6a, the low frequency load current is represented by a sinusoidal waveform. Referring to FIG. 6b, the output voltage waveform is also sinusoidal. However, the bandwidth of the error amplifier is much lower than the load current. Therefore, referring to FIG. 6c, the $V_{error}$ waveform has DC form.

The operation of the power converter control circuit 412 is described as follows. The circuit 412 receives, as its input, the average voltage $V_{avg}$ of the sense voltage $V_{sense}$ and the error voltage $V_{error}$. Typically, the sense resistor $R_{sense}$ is small so as not to use too much power. As a result, the average voltage $V_{avg}$ is small (in the order of millivolts). Thus, the control circuit 412 amplifies the average voltage $V_{avg}$ so that it is on a comparable scale to the voltage $V_{error}$. As previously described, the voltage $V_{error}$ is an amplified version of the difference between the output voltage and the reference voltage. Typically, it is preferable to compare the two voltages when they are in the order of volts.

The power converter control circuit 412 tracks the average voltage $V_{avg}$ to the error voltage $V_{error}$ and adjusts the pulse width of the control signal 420 to the power converter 406 accordingly. The ability of the power converter control circuit to track the average voltage $V_{avg}$ to the error voltage $V_{error}$ is an important factor in limiting the amount of low frequency AC current introduced at the input of the power converter 406. Thus, the type of circuit used for the power converter control circuit depends largely on how pure of a DC signal is desired at the input. In the preferred embodiment, the power converter control circuit is achieved using an average current mode controller, as will be appreciated by a person skilled in the art. However, in actual implementation, peak current mode control pulse width modulation circuits can also be used in order to reduce the cost. In this case, the input current will contain a small amount of low frequency AC current. The low frequency AC current remaining, however, falls within the requirements set by the standard for telecommunication applications. Other implementations will become apparent to a person skilled in the art.

As described above, the average voltage $V_{avg}$ tracks the error voltage $V_{error}$. This is illustrated in the following example. The voltage control circuit 400 is implemented in a telecommunication environment to control the motor speed of a fan in an equipment cabinet. If the temperature in the cabinet rises, for whatever reason, the fan speed needs to increase to cool the equipment cabinet. In order to the increase the fan speed, the voltage at the input to the fan needs to be increased. This is achieved by increasing the reference voltage. As the reference voltage increases, the voltage $V_{error}$ increases, since the difference between the desired voltage and the actual voltage increases. Since the average voltage $V_{avg}$ is tracked to the voltage $V_{error}$, it is increased. As a result, the duty cycle of the power converter is increased, resulting in an increased voltage at the output $V_o$.

Furthermore, the average value of the voltage $V_{avg}$, as illustrated in FIG. 5b, is tracked to the voltage $V_{error}$, which is a relatively pure DC signal. Therefore, the average value of $V_{avg}$ will be equal to $V_{error}$. Consequently the average value of the input current $I_Q$ over will be same. Therefore, the input current $I_Q$, will contain a DC component and high frequency switching components, which can easily be filtered by a high frequency filter. It does not contain the low frequency components related to the load current. As previously described, a high frequency filter does not have the same practical difficulties associated with it as does a low frequency filter.

This combination of the two control loops 416 and 418 forces the power controller and load to appear as a voltage controlled current source when observed from the input power terminals and as a voltage controlled power source when observed from the load terminals.

Although the invention has been described with reference to certain specific embodiments, various modifications thereof will be apparent to those skilled in the art without departing from the spirit and scope of the invention as outlined in the claims appended hereto.

What is claimed is:

1. In a telecommunications system, a circuit for reducing low frequency noise currents drawn from a DC power supply by a load circuit using AC power at low frequencies, said circuit comprising:
   a) a power converter for converting an input voltage to a desired output voltage by repeatedly switching said input voltage on and off;
   b) a first sense circuit for sensing an input signal to said power converter wherein the first sense circuit includes a low pass filter for providing an average value of the input signal;
   c) a second sense circuit for sensing a load signal at said load circuit;
   d) a comparator, coupled to said second sense circuit, for determining and providing as an output a difference signal representative of a difference between said load signal at said load circuit and a predefined reference voltage, said comparator having a limited bandwidth compared to an AC load requirement; and
   e) a power converter control circuit, having inputs connected to said first sense circuit via said low pass filter and to said comparator output, and output connected to said power converter, for controlling a duty cycle of switching of said power converter in accordance with a relationship between said input signal and said difference signal of said comparator.

2. A circuit as defined in claim 1, further comprising an input amplifier for amplifying said input signal.

3. A circuit as defined in claim 2, wherein said comparator further includes a difference amplifier for amplifying said difference.

4. A circuit as defined in claim 3, wherein said input amplifier and said difference amplifier amplify said input signal and said difference, respectively, to a common order of magnitude.

5. A circuit as defined in claim 1, further comprising a high frequency filter, coupled between said DC power supply and said power converter, for reducing a high frequency noise component introduced by switching of said power converter.

6. A circuit as defined in claim 1, wherein said load circuit comprises a fan for cooling said telecommunications system.

7. In a telecommunications system, a circuit for reducing low frequency noise currents drawn from a DC power supply by a load circuit using AC power at low frequencies, said circuit comprising:
   a) power converter means for converting an input voltage to a desired output voltage by repeatedly switching said input voltage on and off;
   b) first sense circuit means for sensing an input signal to said power converter means wherein the first sense circuit means includes low pass filter means for providing an average value of the input signal;
   c) second sense circuit means for sensing a load signal at said load circuit;

d) comparator means, coupled to said second sense circuit means, for determining and providing as an output a difference signal representative of a difference between said load signal at said load circuit and a predefined reference voltage, said comparator means having a limited bandwidth compared to an AC load requirement; and e) power converter control circuit means, having inputs connected to said first sense circuit and to said comparator output, and output connected to said power converter, for controlling a duty cycle of switching of said power converter means in accordance with a relationship between said input signal and said difference signal of said comparator means.

8. A circuit as defined in claim 7, further comprising an input amplifier means for amplifying said input signal.

9. A circuit as defined in claim 8, wherein said comparator means further includes difference amplifier means for amplifying said difference.

10. A circuit as defined in claim 9, wherein said input amplifier means and said difference amplifier means amplify said input signal and said difference, respectively, to a common order of magnitude.

11. A circuit as defined in claim 7, further comprising high frequency filter means, coupled between said DC power supply and said power converter means, for reducing a high frequency noise component introduced by switching of said power converter means.

12. A circuit as defined in claim 7, wherein said load circuit comprises fan means for cooling said telecommunications system.

* * * * *